Patented Sept. 7, 1954

2,688,562

UNITED STATES PATENT OFFICE 2,688,562

MAGNESIA AND CARBON REFRACTORY AND ITS PREPARATION

Howard F. West, Joliet, and John H. Veale, Coal City, Ill., assignors to Illinois Clay Products Company, Joliet, Ill., a corporation of Illinois No Drawing. Application October 21, 1952, Serial No. 316,082

2 Claims. (Cl. 106—56)

This invention relates to basic, unfired refractories.

Refractories made according to the present invention are particularly adapted to be used under the severe conditions existing in ladles in the steel industry in which the basic slag and iron oxide are very destructive. Magnesia is adapted for use in such conditions (among others) by being mixed with carbon and chemically bonded. The magnesia and carbon cooperate to eliminate or suppress the characteristics which render each alone unsuitable for use under the aforesaid conditions.

The further nature of the invention will readily be understood from the following description of illustrative embodiments thereof.

There has been a great and heretofore unsatisfied need for a basic refractory for ladle linings, but for various reasons it has not been possible to provide a practical basic refractory for this purpose. Clay firebrick which have been generally used for ladle linings contribute to the ladle contents a great amount of siliceous material melted from the lining by the molten slag. This is an objectionable addition to the slag since it may cause some of the phosphorous in the slag to return to the steel. As a firebrick lining wears it may become the source of inclusions in the steel. The likelihood of this taking place is a function of the wearing rate of the refractory.

While commercial dead-burned magnesia has greater resistance to iron oxide than any common refractory, it is otherwise wholly unsuited for use as a ladle-lining because it is subject to severe spalling and causes heavy build-up of metal and slag on the lining. Cleaning of the ladle to remove such heavy build-up (called skulls) damages the lining and results in waste. Spalling is caused by the high expansion of a magnesia refractory under heat, and heavy build-up is caused by the high conductivity and high heat capacity of a magnesia refractory. We have found that these undesirable properties of the magnesia can be suppressed or compensated for by incorporating a substantial amount of carbon with the magnesia, but carbon, while an excellent refractory, is sometimes vulnerable to attack in a ladle by the metal and by the iron oxide in the slag. Carbon is attacked by the slag (particularly in low carbon steels) because it reacts with the iron oxide dissolved therein, causing boiling. Carbon may also be dissolved by the metal unless the metal be already saturated with carbon.

Contrary to what one might expect, we have found that the magnesia and the carbon mutually overcome the weaknesses of the other. Our present theory is that, first, the carbon absorbs or cushions the excessive expansion of the magnesia; second, it decreases the thermal conductivity of the refractory; and third, it decreases the heat capacity per unit of volume. The net result of these last two effects is to prevent any substantial build-up of metal and slag in a ladle lined with the present refractories. The magnesia, on the other hand, coats the carbon to protect it from the action of the ladle contents. It is thus possible to employ as refractories in a ladle lining, two excellent refractory elements which have not heretofore been used successfully under such severe conditions. Since repair and relining of ladles involves very high labor costs, the greatly increased life of the ladle lining effects a large saving in cost of operation despite the higher cost of the refractory itself, as compared with the conventional firebrick refractory.

The several aggregates comprising the refractory are advantageously chemically bonded, thus avoiding the high cost attending firing of carbon aggregates and aggregates containing carbon. Such aggregates must be fired under reducing conditions, which involves surrounding the refractory in the kiln with coke. Usually, such refractories must be embedded in coke-filled saggers for firing.

In the present instance the chemical bond is advantageously formed from a portion of the magnesia by reacting it with sulphuric acid to form a magnesium oxysulphate bond. Such a bond is quite refractory and does not decompose below about 2055 degrees F. While this temperature is exceeded in use, service temperatures above 2055 degrees F. penetrate only a short distance into the exposed surface of the refractory. The chemical bond remains intact in the balance of the refractory unless and until such temperatures are exceeded. However, at about 1900 degrees F. a supplemental bond in the nature of a sinter or ceramic bond starts to form from the clay and serves as a supplemental bonding agent to maintain the integrity of the refractory, especially in the regions where the chemical bond has been destroyed. The formation of the aforesaid sinter or ceramic bond begins with sintering of the clay in the presence of some of the magnesia. The clay and magnesia constitute a eutectic mixture which sinters at relatively low temperatures, e. g. about 2250 degrees F. Impurities such as iron, lime and alkali cause sintering at temperatures below the sintering point of either the clay or the magnesia, or of the sintering temperature of a eutectic mixture of pure magnesia and clay alone. As this mixture becomes plastic it dissolves additional magnesia. When a ratio of about 52% magnesia to 48% clay is exceeded, the mixture becomes quite refractory and shows no fusion below 3092 degrees F., which is a temperature above the service temperatures at which the present refractory functions. Thus, the sintered bond becomes progressively more refractory with absorption of magnesia. In its stable form it comprises forsterite, $2MgO \cdot SiO_2$, and spinel, $MgO \cdot Al_2O_3$. Preferably the clay is finely ground (minus 30 mesh) to promote the reaction between the clay and magnesia to form forsterite and spinel. Spinel and forsterite both have lower thermal expansion than magnesia, and this improves the spalling resistance of the refractory.

The ratio of the forsterite to the spinel depends upon the relative amounts of silica and alumina present in the clay and in the magnesia.

To facilitate rapid solution of the magnesia in the sintered or fused clay, the dead-burned magnesia is used in finely ground condition, i. e. minus 30 mesh, with about 50% minus 100 mesh. The limiting factor in the fineness of the magnesia is the pressability of the mixture, since too many fines cause poor grain sizing and corresponding loss in density. Solution of the magnesia in the clay is rapid, and the refractoriness of the sinter or ceramic bond increases rapidly. In this connection it should be understood that the development of the sinter or ceramic bond (from the service face of the refractory outwardly) takes place progressively, and that at any one time only a small portion of the thickness of the refractory is affected. The chemical and mechanical bonds maintain the integrity of the refractory during the development of the sinter or ceramic bond. Indeed, under the conditions existing in a ladle, the temperature gradient from the hot face of the refractory to the cool outer face thereof, is very steep, i. e. from 2800 degrees F. to 400 degrees F. in a four inch thick refractory. Therefore, only a depth not exceeding one inch from the hot face of the refractory is affected. The chemical bond in the balance of the refractory is unaffected.

Dead-burned magnesia is generally calcined at about 3200 degrees F. In some cases iron oxide is added in the form of mill scale or the like to aid in sintering the magnesia. This mixture sinters at or below 3200 degrees F. (although magnesia does not melt below 5072 degrees F.) accompanied by the desired shrinkage in the magnesia, to form grain or granules which are ground to the fineness above stated.

The sulphuric acid to form the chemical bond is added to the mixture of dry constituents in such small amount (about 1 to 5% commercial concentrated—66 degrees Bé.) as to react with only a small part of the magnesia to form a bond. Indeed, the acid reacts with only about an equal weight of magnesia, leaving a substantial amount unreacted and available as aforesaid for the formation of forsterite and spinel. The chemical bond decomposes in use at about 2055 degrees F. In service the clay starts to sinter at about 1900 degrees F. While the eutectic mixture of clay and magnesia does not start to become plastic or sinter until about 2250 degrees F., this takes place, as stated above only in the small portion of the thickness of the refractory and there is no serious weakening of the refractory.

While the theoretical temperature for fusion of the eutectic mixture of clay and magnesia is about 2450 degrees F., actually impurities in the mixture cause fusion at the lower temperature given above. A eutectic mixture of clay and magnesia is about 77% clay and 23% magnesia (disregarding impurities such as iron and lime and alkalis which are responsible for lowering the fusion point).

The amount of carbon granules used is determined by what is necessary to cushion the expansion of the magnesia, and to reduce its conductivity and specific heat adequately. On the other hand, the amount of carbon is limited by what can adequately be coated and protected by the magnesia matrix. In the present instance the magnesia is adequate to protect carbon granules (of 6 mesh or less) comprising as much as half of the volume of the refractory but a much smaller proportion of carbon (15% by volume) will satisfactorily compensate for expansion of the magnesia and adequately reduce conductivity and heat capacity. An illustrative screen analysis of the carbon is minus 6 mesh with 75% on 30 mesh. The carbon granules have a much lower bulk density than the magnesia, resulting in a bulk density of 1.27 oz./cu. in. as compared with a bulk density of 1.71 oz./cu. in. for a magnesite (magnesia) brick. The carbon used is advantageously calcined petroleum coke, calcined at about 2600 degrees F. Calcining tends to shrink the surface of the granules and thereby to seal them against penetration of slag and metal. The granules being of relatively coarse mesh provide spaces between them for absorbing or cushioning the expansion of the magnesia by permitting entry into such spaces of some of the magnesia or the supplemental bonding agent.

Reaction of the acid with the magnesia is relatively slow (as compared with the speed of its reaction with caustic magnesia) thereby giving time for molding and pressing of the refractory after addition of the aggregate and mixing of the dry solids with the acid. To minimize the time required to dry the refractories after forming, the amount of water (about 7% on the solids) added in mixing the ingredients is limited to what is necessary to produce with the acid a working consistency and secure uniform distribution of the several constituents throughout the mixture. Preferably the consistency of the mixture is a so-called dry consistency suitable for dry pressing; and the mixture may advantageously be pressed in a conventional press used for dry pressing clay refractories.

After forming, the refractories are dried, both to remove excess moisture and to develop the strength of the chemical bond by completing the reaction. Drying temperatures are preferably of the order of 400 degrees F., to develop water resistance although strength is developed at temperatures around 212 degrees F. These temperatures insure reaction with the magnesia to form magnesium oxysulphate cement, even though the magnesia be dead burned.

In one illustrative refractory, the proportions by weight of the solid constituents are:

| | Per cent by weight |
|---|---|
| Magnesia (dead-burned) | 50–70 |
| Carbon (calcined petroleum coke) | 10–30 |
| Clay (fire clay) | 10–25 |

It should be understood that the proportions given above are for a typical fire clay and dead-burned magnesia, i. e. fire clay and magnesia containing typical amounts of impurities. The proportions will vary depending on the purity of the magnesia and clay, the greater the amount of fluxing impurities (e. g. alkalies, lime, iron, etc.) the more magnesia and the less clay necessary to offset the fluxing effect. The best mixture for commercial grades of magnesia and fire clay has a magnesia to fire clay ratio between 2 and 3 to 1.

Calcined petroleum coke possesses a number of advantages over other forms of carbon. It has low bulk density and yet does not shrink at steel making temperatures. It is available in granular form of an advantageous screen analysis, and is relatively inexpensive.

In use, the molten slag and metal do not easily wet the carbon, and therefore the surface tension of the molten material prevents penetration of the latter between the granules of carbon even after normal erosion has partly exposed them. Slag, metal and iron oxide cannot therefore effectively reach either the carbon granules or the ceramic or sinter bond.

A basic refractory of this character has a number of advantages resulting from the properties already enumerated. It prevents re-phosphorization of the metal by maintaining an adequate degree of basicity of the slag. For the same reasons, it reduces manganese loss from the metal. It promotes the two conditions necessary for desulphurization, namely the basic slag in the presence of carbon (in the refractory). The magnesia protects the carbon from objectionable reaction with the iron oxide in the slag (associated with low carbon steels), and therefore minimizes boiling in the ladle.

Obviously the invention is not limited to the details of the illustrative product and its method of manufacture since these may be variously modified. Moreover it is not indispensable that all features of the invention be used conjointly since various features may be used to advantage in different combinations and sub-combinations.

Having described our invention, we claim:

1. A basic refractory consisting essentially of 50 to 70 percent by weight of dead burned magnesia, 10 to 30 percent by weight of carbon granules, and 10 to 25 percent by weight of fire clay, said magnesia, fire clay and carbon being intimately mixed and bonded together by the product of the reaction of a portion of the magnesia with sulphuric acid.

2. The method of making a molded basic refractory which consists in mixing 10–30 percent by weight carbon granules, 10–25 percent by weight of fire clay, and 50–70 percent by weight of dead burned magnesia, distributing throughout such mixture 1–5% concentrated sulphuric acid, then heating the mixture to 212–400° F. to develop magnesium oxysulphate cement to bond the mixture, then heating the bonded product in service to produce a partial fusion of the clay thereby to cause solution of the magnesia in the clay and reaction of the magnesia and clay to produce forsterite and spinel.

References Cited in the file of this patent

UNITED STATES PATENTS

| Number | Name | Date |
|---|---|---|
| 261,430 | Clapp et al. | July 18, 1882 |
| 529,450 | Kirchmann et al. | Nov. 20, 1894 |
| 2,045,494 | Riddle | June 23, 1936 |
| 2,354,754 | Kleinschmidt et al. | Aug. 1, 1944 |
| 2,599,184 | Lathe | June 3, 1952 |
| 2,626,871 | Zinszer | Jan. 27, 1953 |